US 9,923,912 B2

(12) United States Patent
Franc et al.

(10) Patent No.: US 9,923,912 B2
(45) Date of Patent: Mar. 20, 2018

(54) LEARNING DETECTOR OF MALICIOUS NETWORK TRAFFIC FROM WEAK LABELS

(71) Applicant: Cisco Technology, Inc., San Jose, CA (US)

(72) Inventors: Vojtech Franc, Roudnice nad Labem (CZ); Michal Sofka, Prague (CZ); Karel Bartos, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 90 days.

(21) Appl. No.: 14/960,086

(22) Filed: Dec. 4, 2015

(65) Prior Publication Data
US 2017/0063893 A1 Mar. 2, 2017

Related U.S. Application Data

(60) Provisional application No. 62/211,368, filed on Aug. 28, 2015.

(51) Int. Cl.
H04L 29/06 (2006.01)
G06F 21/53 (2013.01)

(52) U.S. Cl.
CPC .......... *H04L 63/1425* (2013.01); *G06F 21/53* (2013.01); *H04L 63/0281* (2013.01)

(58) Field of Classification Search
CPC .. H04L 63/1425; H04L 63/0281; G06F 21/53
See application file for complete search history.

(56) References Cited

U.S. PATENT DOCUMENTS 8,935,188 B2 * 1/2015 Duffield ............... H04L 43/045
706/12
9,094,288 B1 * 7/2015 Nucci ................... H04L 43/026
(Continued)

FOREIGN PATENT DOCUMENTS

EP 2819365 A1 12/2014
WO 2013053407 A1 4/2013

OTHER PUBLICATIONS

Pachghare, et al., "Pattern Based Network Security Using Semi-Supervised Learning," International Journal of Information & Network Security (IJINS), vol. 1, No. 3, Aug. 2012, pp. 228-234.
(Continued)

*Primary Examiner* — David Garcia Cervetti
(74) *Attorney, Agent, or Firm* — Edell, Shapiro & Finnan, LLC

(57) ABSTRACT

Techniques are presented that identify malware network communications between a computing device and a server utilizing a detector process. Network traffic records are classified as either malware or legitimate network traffic records and divided into groups of classified network traffic records associated with network communications between the computing device and the server for a predetermined period of time. A group of classified network traffic records is labeled as malicious when at least one of the classified network traffic records in the group is malicious and as legitimate when none of the classified network traffic records in the group is malicious to obtain a labeled group of classified network traffic records. A detector process is trained on individual classified network traffic records in the labeled group of classified network traffic records and network communication between the computing device and the server is identified as malware network communication utilizing the detector process.

20 Claims, 10 Drawing Sheets

(56) References Cited

U.S. PATENT DOCUMENTS

| | | | |
|---|---|---|---|
| 2001/0056431 A1* | 12/2001 | Sharples | G06F 9/54 |
| 2002/0035573 A1* | 3/2002 | Black | G06Q 30/02 |
| 2003/0097439 A1* | 5/2003 | Strayer | H04L 12/5885 709/224 |
| 2004/0199791 A1* | 10/2004 | Poletto | H04L 12/2602 726/23 |
| 2004/0221190 A1* | 11/2004 | Roletto | H04L 41/0893 714/4.1 |
| 2005/0044213 A1* | 2/2005 | Kobayashi | H04L 43/10 709/224 |
| 2006/0128406 A1* | 6/2006 | Macartney | H04L 63/1416 455/466 |
| 2007/0280187 A1* | 12/2007 | Wang | H04L 63/1416 370/338 |
| 2008/0188188 A1* | 8/2008 | Malomsoky | H04L 43/0852 455/90.2 |
| 2009/0234899 A1* | 9/2009 | Kramer | G06F 17/30539 708/200 |
| 2009/0262657 A1* | 10/2009 | Ekelin | H04L 41/0896 370/252 |
| 2010/0037314 A1* | 2/2010 | Perdisci | H04L 63/1416 726/22 |
| 2010/0299287 A1* | 11/2010 | Cao | H04L 41/142 706/12 |
| 2011/0090950 A1* | 4/2011 | Bush | H04N 19/196 375/240.02 |
| 2011/0149960 A1 | 6/2011 | Fernandez Gutierrez | H04L 12/18 370/390 |
| 2011/0219111 A1* | 9/2011 | Shevenell | G06F 15/173 709/224 |
| 2011/0283361 A1* | 11/2011 | Perdisci | G06F 21/56 726/24 |
| 2011/0286555 A1* | 11/2011 | Cho | H04L 27/0006 375/343 |
| 2011/0314542 A1* | 12/2011 | Viswanathan | G06F 21/554 726/23 |
| 2013/0013542 A1* | 1/2013 | Sen | G06N 99/005 706/12 |
| 2013/0305374 A1* | 11/2013 | Rubin | G06F 21/554 726/24 |
| 2014/0041032 A1* | 2/2014 | Scheper | H04L 63/14 726/23 |
| 2015/0052601 A1* | 2/2015 | White | H04L 63/1416 726/13 |
| 2015/0120639 A1* | 4/2015 | Shin | G06N 99/005 706/52 |
| 2015/0271787 A1* | 9/2015 | Wong | H04B 7/0608 370/329 |
| 2015/0295945 A1* | 10/2015 | Canzanese, Jr. | G06F 9/45545 726/23 |
| 2016/0063358 A1* | 3/2016 | Mehrseresht | G06F 17/30256 382/190 |
| 2016/0110657 A1* | 4/2016 | Gibiansky | G06N 99/005 706/12 |

OTHER PUBLICATIONS

Ma, et al., "Identifying Suspicious URLs: An Application of Large-Scale Online Learning," Proceedings of the 26th International Conference on Machine Learning, Jun. 2009, 8 pages.

Abu-Nimeh, et al., A Comparison of Machine Learning Techniques for Phishing Detection, APWG eCrime Researchers Summit, Oct. 2007, 10 pages.

Castillo, et al., "Know your Neighbors: Web Spam Detection using the Web Topology," In Proceedings of the 30th annual international ACM SIGIR conference on Research and development in information retrieval, SIGIR'07, Jul. 2007, pp. 423-430.

Li, et al., "An Internet Traffic Classification Method Based on Semi-Supervised Support Vector Machine," 2011 IEEE International Conference on Communications (ICC), Jun. 2011, 5 pages.

* cited by examiner

700

705 — CLASSIFYING NETWORK TRAFFIC RECORDS AS EITHER MALWARE NETWORK TRAFFIC RECORDS OR LEGITIMATE NETWORK TRAFFIC RECORDS

710 — DIVIDING CLASSIFIED NETWORK TRAFFIC RECORDS INTO AT LEAST ONE GROUP OF CLASSIFIED NETWORK TRAFFIC RECORDS, THE AT LEAST ONE GROUP INCLUDING CLASSIFIED NETWORK TRAFFIC RECORDS ASSOCIATED WITH NETWORK COMMUNICATIONS BETWEEN A COMPUTING DEVICE AND A SERVER FOR A PREDETERMINED PERIOD OF TIME

715 — LABELING THE AT LEAST ONE GROUP OF CLASSIFIED NETWORK TRAFFIC RECORDS AS MALICIOUS WHEN AT LEAST ONE OF THE CLASSIFIED NETWORK TRAFFIC RECORDS IN THE AT LEAST ONE GROUP IS MALICIOUS OR LABELING THE AT LEAST ONE GROUP OF CLASSIFIED NETWORK TRAFFIC RECORDS AS LEGITIMATE WHEN NONE OF THE CLASSIFIED NETWORK TRAFFIC RECORDS IN THE AT LEAST ONE GROUP IS MALICIOUS TO OBTAIN AT LEAST ONE LABELED GROUP OF CLASSIFIED NETWORK TRAFFIC RECORDS

720 — TRAINING A DETECTOR PROCESS ON INDIVIDUAL CLASSIFIED NETWORK TRAFFIC RECORDS IN THE AT LEAST ONE LABELED GROUP OF CLASSIFIED NETWORK TRAFFIC RECORDS TO LEARN A FLOW-LEVEL MODEL BASED ON THE LABELING OF THE AT LEAST ONE GROUP OF CLASSIFIED NETWORK TRAFFIC RECORDS

725 — IDENTIFYING MALWARE NETWORK COMMUNICATIONS BETWEEN THE COMPUTING DEVICE AND THE SERVER UTILIZING THE FLOW-LEVEL MODEL OF THE DETECTOR PROCESS

FIG.7

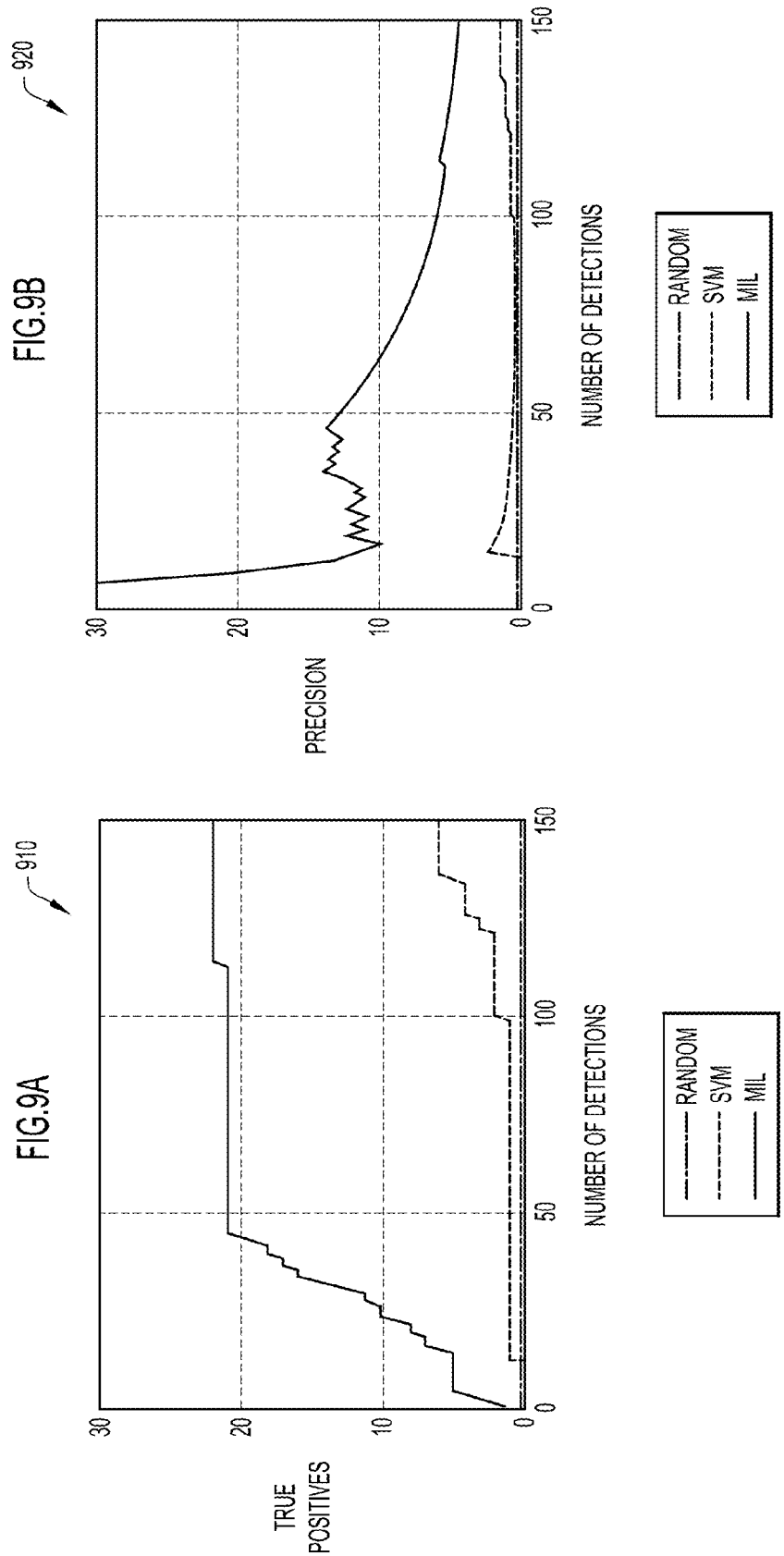

US 9,923,912 B2

LEARNING DETECTOR OF MALICIOUS NETWORK TRAFFIC FROM WEAK LABELS

CROSS REFERENCE TO RELATED APPLICATION

This application claims priority to U.S. Provisional Patent Application No. 62/211,368, filed Aug. 28, 2015, the entirety of which is incorporated herein by reference.

TECHNICAL FIELD

The present disclosure relates to malware detection.

BACKGROUND

The detection of malicious communication by learning-based detectors is based on generic features describing the communication. For example, the features extracted from proxy log attributes can be used in training to discriminate between malicious and legitimate Hypertext Transfer Protocol (HTTP) requests.

A problem of supervised training in network security is the availability of a sufficiently large and representative dataset of labeled malicious and legitimate samples. The labels are expensive to obtain since the process involves forensic analysis performed by security experts. Sometimes, the labels are not even possible to assign, especially if the context of the network communication is small or unknown and the assignment is desired at a proxy-log level.

Furthermore, the labeled dataset becomes obsolete quite quickly, as a matter of weeks or months, due to the constantly evolving malware. As a compromise, domain-level labeling has been frequently adopted by compiling blacklists of malicious domains registered by the attackers. The domain blacklists can be used to block network communication based on the domain of the destination Uniform Resource Locator (URL) in the proxy log. However, the malicious domains typically change frequently as a basic detection evasion technique. Even though the domains might change, the other parts of the HTTP request (and the behavior of the malware) remain the same or similar.

BRIEF DESCRIPTION OF THE DRAWINGS

FIG. 7 is a flow chart depicting operations performed by a networking device to train a detector process and to identify malware network communications utilizing the trained detector process according to an example embodiment.

FIGS. 9A-9D are diagrams illustrating test results of the system depicted in FIG. 1 according to an example embodiment.

DESCRIPTION OF EXAMPLE EMBODIMENTS

Overview

Techniques are presented herein to use a detector process to identify network communication between a computing device and a server as malware network communication. Network traffic records are classified as either malware network traffic records or legitimate network traffic records. The classified network traffic records are divided into at least one group of classified network traffic records, the at least one group including classified network traffic records associated with network communications between a computing device and a server for a predetermined period of time. The at least one group of classified network traffic records is labeled as malicious when at least one of the classified network traffic records in the at least one group is malicious. The at least one group of classified network traffic records is labeled as legitimate when none of the classified network traffic records in the at least one group is malicious. The labeling is performed to obtain at least one labeled group of classified network traffic records. A detector process is trained on individual classified network traffic records in the at least one labeled group of classified network traffic records to learn a flow-level model based on the labeling of the at least one group of classified network traffic records, and malware network communications between the computing device and the server are identified utilizing the flow-level model of the detector process.

Example Embodiments

Presented herein is a data-driven classification system that relies on a Multiple Instance Learning (MIL) approach to classify malicious network communication. The classification system recognizes malicious traffic by learning from weak annotations. Weak supervision in training is achieved on the level of properly defined "bags" of network traffic records such as proxy logs by leveraging Internet domain blacklists, whitelists, security reports, and sandboxing analysis. A "bag" of network traffic records is a set of network traffic records or flows with the same user and with a particular domain. A number of generic features are extracted from proxy logs of HTTP requests and a detector of malicious communication is trained using publicly-available blacklists and whitelists of malware domains. Since the blacklists and whitelists contain labeling only at the level of domains while the detector operates on richer proxy logs with a full target web site URL, the labeled domains only provide weak supervision for training.

Figure 1:
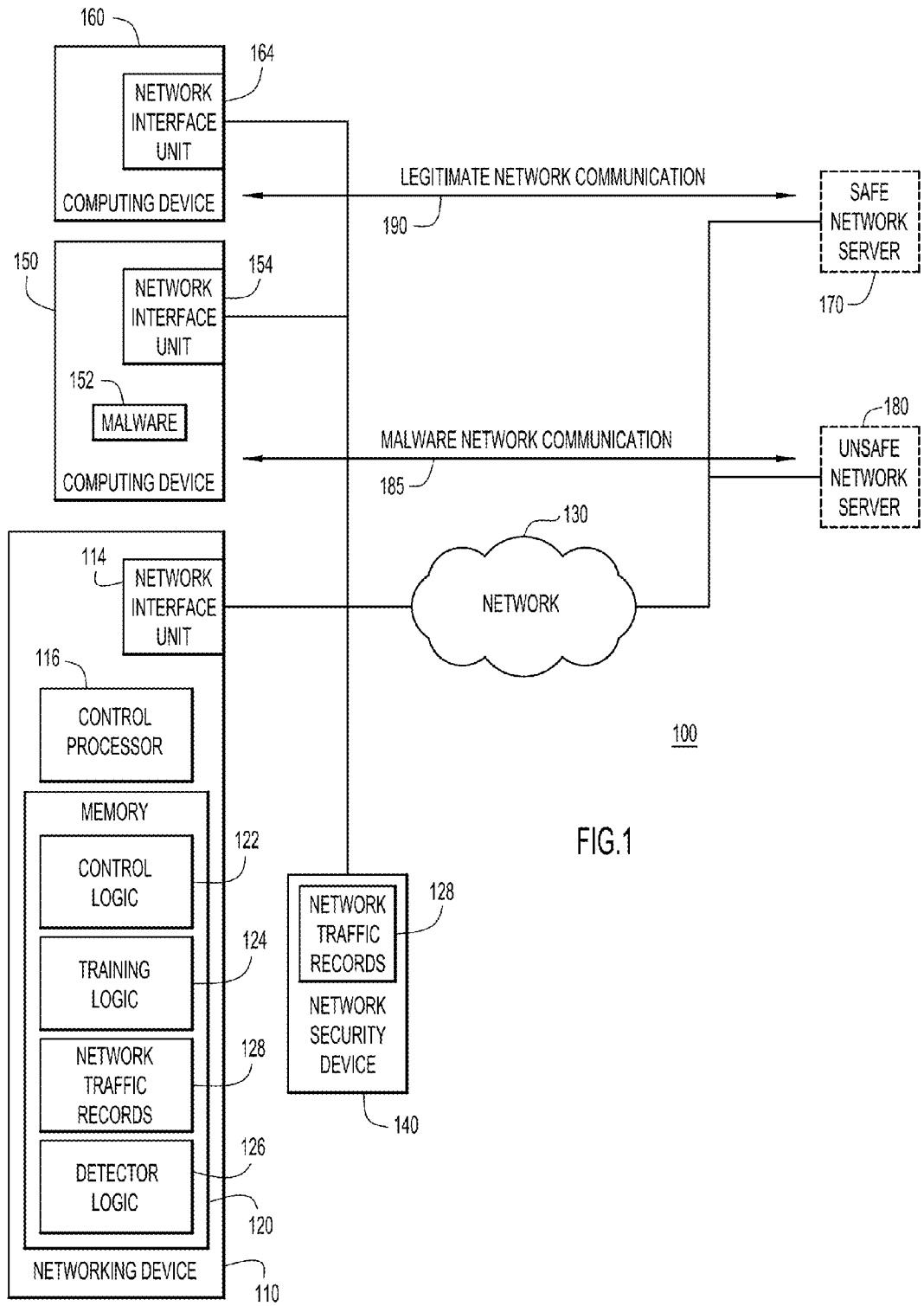
FIG. 1 is a diagram of a network environment illustrating a networking system in which a detector for malicious network traffic is trained from weak labels according to an example embodiment.

FIG. 1 is a block diagram of a network environment 100 in which malware detection techniques presented herein may be employed. Network environment 100 includes networking device 110 which may be a server computer, a firewall, a network intrusion device, etc. Networking device 110 includes network interface unit 114 (e.g., a network port of a network interface card), control processor 116 and memory 120. Memory 120 stores instructions for, among other functions, control logic 122, training logic 124, and detector logic 126. Memory 120 also stores network traffic records 128. Network interface unit 114 connects networking device 110 with network 130 (e.g., the Internet).

Network security device 140 (e.g., a firewall) or any other network device connected to network 130 may generate network traffic records 128 (e.g. proxy logs or NetFlow records) that are sent to networking device 110 and stored in memory 120.

The memory 120 may be read only memory (ROM), random access memory (RAM), magnetic disk storage media devices, optical storage media devices, flash memory devices, electrical, optical, or other physical/tangible memory storage devices. Thus, in general, the memory 120 may comprise one or more tangible (non-transitory) computer readable storage media (e.g., a memory device) encoded with software comprising computer executable instructions and when the software is executed (by the processor 116) it is operable to perform the operations described herein. The networking device 110 performs the operations described below in connection with FIGS. 2-7 when executing the software stored in memory 120.

As shown in FIG. 1, network environment 100 further includes computing device 150 on which malware 152 resides and is executed, and which is connected to network 130 via network interface unit 154. FIG. 1 also shows computing device 160 which is connected to network 130 via network interface unit 164 and which is not infected by malware. Computing devices 150 and 160 may be, for example, part of an enterprise network (not shown), and the enterprise network may include, but is not limited to, a plurality of computing devices, servers and other networking devices that may be infected by malware.

In addition, several other network elements may be connected to network 130, such as for example, safe network server 170 and unsafe network server 180. FIG. 1 further shows malware network communication 185 between infected computing device 150 and unsafe network server 180 and legitimate network communication 190 between computing device 160 and safe network server 170.

Figure 2:
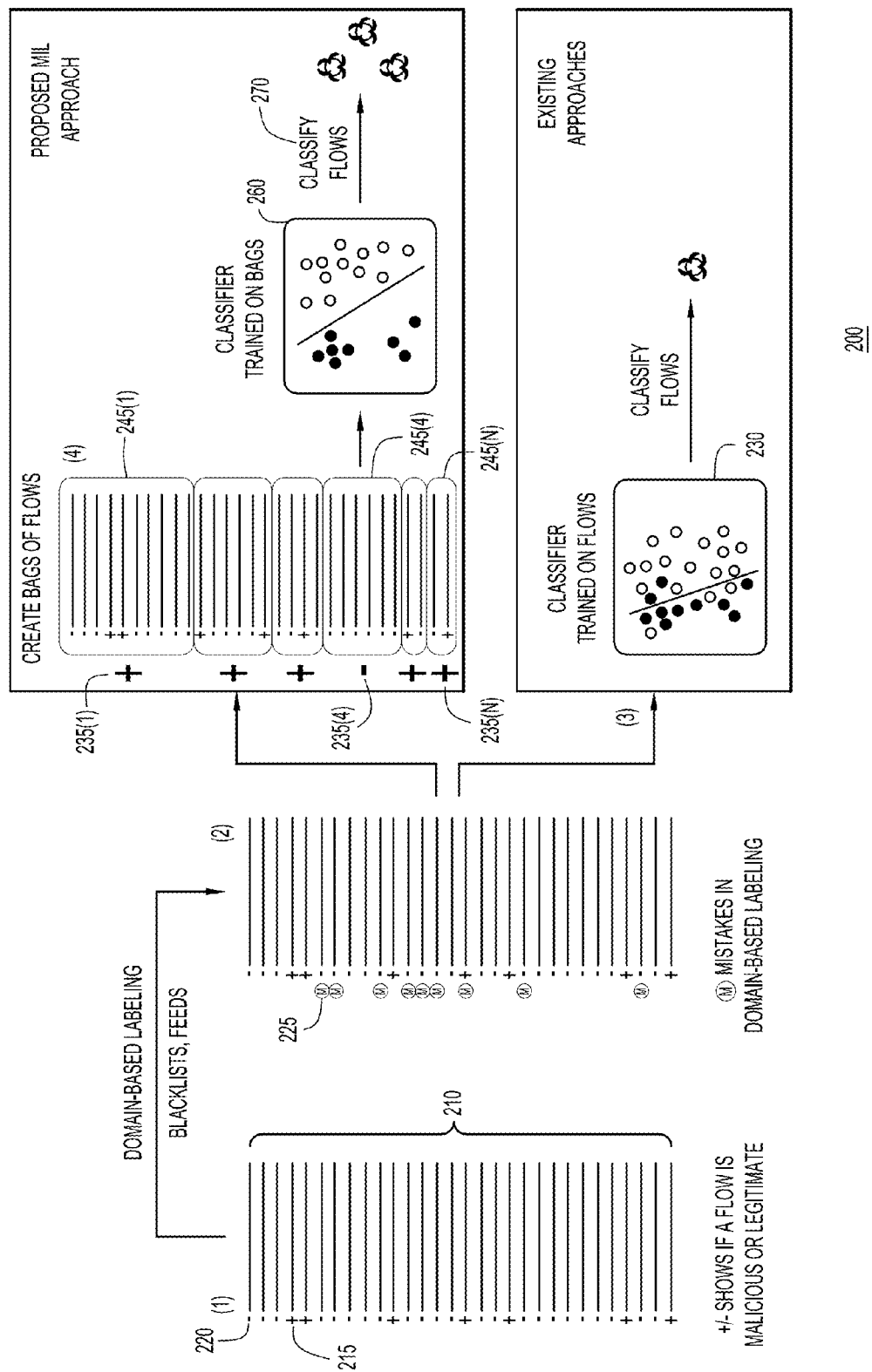
FIG. 2 is a diagram of a detector system for detecting malicious network traffic by learning from weak labels according to an example embodiment.

Reference is now made to FIG. 2 (with continued reference to FIG. 1). FIG. 2 is a diagram of detector system 200 for detecting malicious network traffic by learning from weak annotations or labels. At processing stage 1, network traffic records 210 from a training set are associated (by training logic 124 shown in FIG. 1) with either malicious traffic or legitimate traffic. The network traffic records may be network proxy logs containing various attributes or features that are specific to the Hypertext Transfer Protocol (HTTP). The network proxy logs may represent network flows which are sequences of packets representing network communications (such as malware network communication 185 and legitimate network communication 190 in FIG. 1) that are sent between a source computing system such as computing devices 150 and 160 in FIG. 1 and a destination computing device such as unsafe network server 170 and safe network server 180 in FIG. 1. Port numbers may be changed during the communication which results in more flows. Network traffic is bidirectional. Thus, network traffic records such as proxy logs contain data for both directions of a communication of a given flow.

As shown in FIG. 2, at processing stage (1), plus signs 215 or minus signs 220, for a malicious or a legitimate flow, respectively, are assigned to each flow of the training set thereby classifying the network traffic records or flows as either malware traffic records or legitimate traffic records. Unfortunately, information to classify the network traffic records of the training set is difficult to obtain and is often not available for training. Therefore, third party feeds, blacklists, domain reputation reports, security reports and sandboxing analysis results are used to classify the training data. However, these lists are mostly domain-based and introduce mistakes 225 in classifying as illustrated at processing stage (2) in FIG. 2. If a conventional classifier 230 is trained only based on these misclassified flows as shown in processing stage (3), this results in poor performance of the classifier 230.

To avoid such a poor performance, at processing stage (4), the techniques presented herein utilize the network traffic records of the training set that were classified in processing stage (1) using the third party feeds, blacklists, domain reputation reports, security reports and sandboxing analysis results, to create weak labels 235(1) to 235(N) of groups of network traffic records called "bags" 245(1) to 245(N). A bag, such as bag 245(1) is labeled as positive (malicious) if at least one network traffic record or flow included in the bag is classified as positive (malicious). Otherwise, the bag (e.g., bag 245(4)) is labeled as negative (legitimate). Classification can be performed by searching publicly available databases, such as for example, the "VirusTotal" service discussed below with regard to FIGS. 9A to 9D.

The MIL classifier 260 (which corresponds to detector logic 126 in FIG. 1) is trained by training logic 124 on a flow level, i.e., MIL classifier 260 learns a flow-level model based on weak labels 235(1) to 235(N) from the bags (e.g., bags 245(1) and 245(N)) and optimizes the decision boundary, which results in better separation between malicious and legitimate flows and thus in higher malware detection efficacy.

Figure 3:
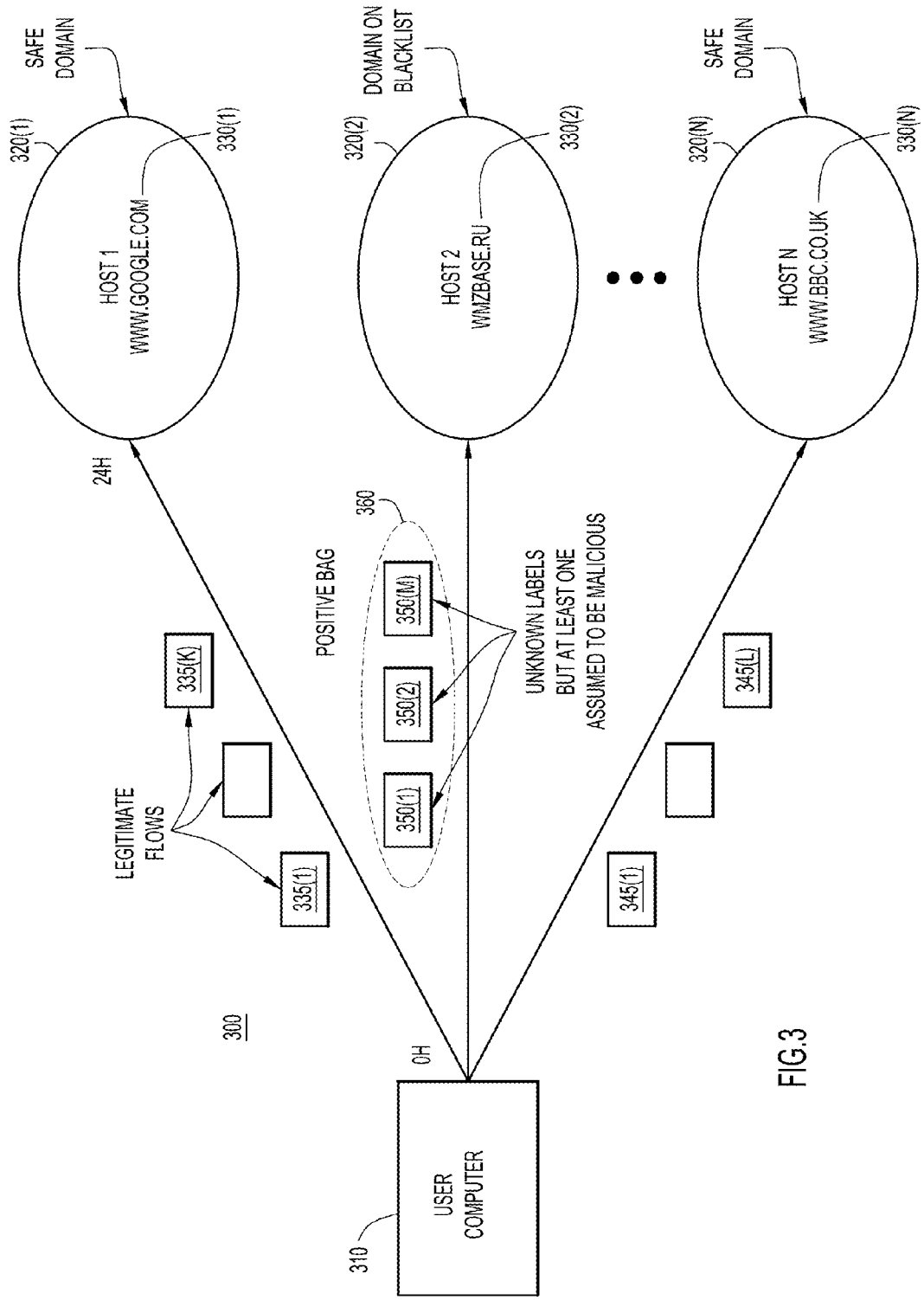
FIG. 3 is a diagram illustrating network traffic records of a training set that are associated with malicious or legitimate network traffic according to an example embodiment.

Reference is now made to FIG. 3 (with continued reference to FIGS. 1 and 2) which shows computing network 300. FIG. 3 illustrates how network traffic records of a training set are associated with malicious network traffic or legitimate network traffic based on blacklists and whitelists. Computing network 300 includes user computer 310 (which corresponds to computing device 150 in FIG. 1) and host computers 320(1) to 320(N) (which correspond to safe network server 170 and unsafe network server 180 in FIG. 1).

As shown in FIG. 3, user computer 310 communicates with domains 330(1) to 330(N) hosted by host computers 320(1) to 320(N). Network traffic records that include the respective domains 330(1) to 330(N) and that identify user computer 310 as the communication source are collected over 24 hours by a network security device (not shown) such as network security device 140 in FIG. 1. Domains 330(1) and 330(N) hosted by host computers 320(1) and 320(N) are classified (e.g., by a trainings logic residing on user computer 310 that corresponds to training logic 124 in FIG. 1) as safe domains based on blacklists and whitelists. Network traffic records 335(1) to 335(K) relating to the communication between user computer 310 and domain 330(1) hosted by host computer 320(1) are classified as negative or legitimate network traffic records. Similarly, network traffic records 345(1) to 345(L) relating to network communication between user computer 310 and domain 330(N) hosted by host computer 320(N) are classified as legitimate flows and are labeled as negative or legitimate network traffic records.

In addition, FIG. 3 shows network traffic records 350(1)-350(M). For these network traffic records, accurate information is not available for classification. However, since domain 330(2) is on a blacklist, at least some of the network traffic records 350(1) to 350(M) are assumed to be malicious and therefore bag 360 which contains network traffic records 350(1) to 350(M) is labeled as malicious.

Returning back to FIG. 2 (with continued reference to FIG. 1). At processing stage (5), MIL classifier 260 classifies regular network traffic records 270 as legitimate or malicious flows thereby identifying network communication between a computing device (e.g., computing device 150 in FIG. 1) and a server (e.g., unsafe network server 180 in FIG. 1) as malware network connection.

As described above, leveraging the labels 235(1) to 235(N) at the level of bags has the advantage that publicly available sources of domain blacklists can be used for training MIL classifier 260. The problem is formulated as weakly supervised learning since the bag labels 235(1) to 235(N) are used to train MIL classifier 260 as a classifier of individual regular network traffic or individual flows 270. In other words, instead of using manually labeled positive examples of network communication, an algorithm based on the MIL uses the bags 235(1) to 235(N) of network traffic records 210 (or proxy logs) describing communication of users to the black-listed domains in the network traffic records 210 which correspond to network traffic records 128 in FIG. 1. As described in further detail below, the MIL algorithm seeks a Neyman-Pearson (NP) detector with a very low false positive rate.

Generally, learning of the NP detector is formulated as an optimization problem with two terms: false negatives are minimized while choosing a detector with prescribed and guaranteed (very low) false positive rate. False negatives and false positives are approximated by empirical estimates computed from the weakly annotated data. A hypothesis space of the detector is composed of linear decision rules parametrized by a weight vector and an offset. The described Neyman-Pearson learning process is a modification of the Multi-Instance Support Vector Machines (mi-SVM) algorithm.

When comparing the problem to be solved for a standard mi-SVM algorithm with the problem to be solved by the NP process of the detector described herein, three general modifications can be observed.

As a first modification, the standard mi-SVM detector problem formulation aims to resolve a linear decision rule with a small classification error. However, the classification error is not a relevant performance measure in the malware detection problem. Instead, the malware detector needs to have a guaranteed (low) false positive rate and at the same time it should minimize the false negative rate. This decision making problem, known as the Neyman-Pearson task, can be solved by finding the decision rule minimizing a weighted sum of the false-positive and the false-negative rates. The weight is not known a priori but it can be efficiently tuned on validation examples as shown below.

As a second modification, the standard mi-SVM detector uses a quadratic regularization term to avoid over-fitting. However, in the malware detection problem, the number of examples is an order of a magnitude higher than the number of weights to be learned. That is, there is only a small chance of over-fitting. Hence, in the optimization problem formulation of the NP detector, the quadratic regularization is removed. Not removing the quadratic regularization would require tuning the weight of this additional term which would result in a larger training time.

As a third modification, the standard mi-SVM problem formulation assumes that the negative class is described by bags of network traffic records or instances. For the NP detector, negative instances are not grouped to bags. Instead, the negative class is described by independent network traffic records or instances as in the ordinary (supervised) classification problem. That is, the techniques described herein aim to minimize the number of misclassified negative instances. In contrast, the standard mi-SVM detector optimizes the number of misclassified negative bags.

The strength of the MIL algorithm is that it minimizes a weighted sum of errors made by the detector on the negative bags and the positive bags. The error of each positive bag is determined by a single instance that has the maximal distance from the malicious/legitimate decision hyperplane. Removal of the other non-active instances from the training set would not change the solution. Hence the MIL algorithm can be seen as a two stage procedure though the stages are executed simultaneously.

Figure 4:
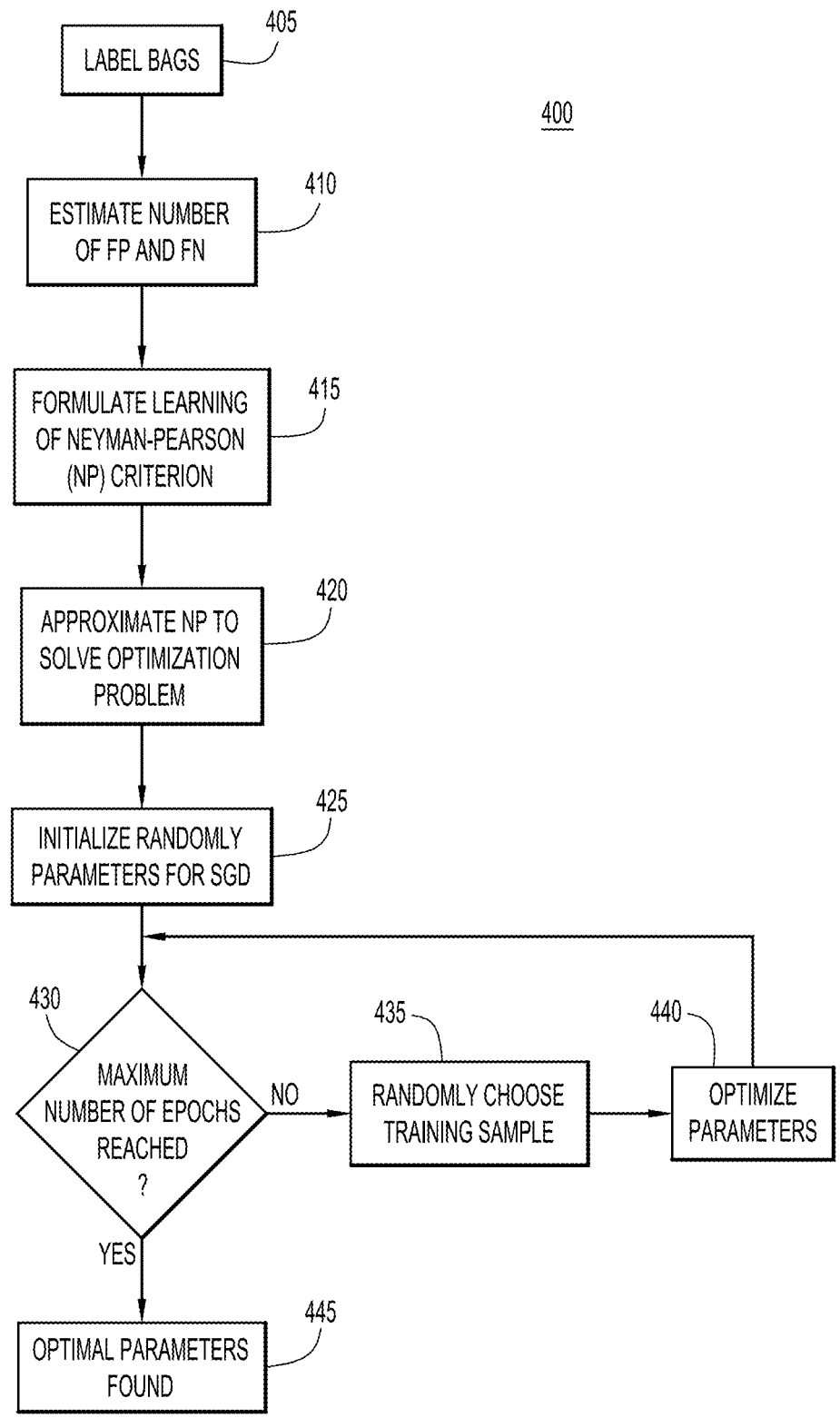
FIG. 4 is a flowchart illustrating a formulation of a learning problem and its solution for a Multiple Instance Learning (MIL) process of a Neyman-Pearson (NP) detector according to an example embodiment.

Referring now to FIG. 4 (with continued reference to FIGS. 1 and 2), a flowchart is described of method 400 for formulating a learning problem and its solution for the MIL process of a NP detector which corresponds to detector logic 126 in FIG. 1 and MIL classifier 260 in FIG. 2.

Method 400 begins at 405. At 405, bags, such as bags 245(1) to 245(N) in FIG. 2 are labeled as positive or negative bags. Method 400 continues to 410 at which a number of false positive and false negative results are estimated.

At 415, a learning criterion of the NP process is formulated. Step 415 starts with defining a statistical model of the data. A network traffic record or flow is described by a feature vector $x \in X \subseteq \mathbb{R}^d$ and a label $y \in Y = \{+1, -1\}$. Labels y may have values of +1 and −1. A value of y=+1 describes malicious network traffic records and a value of y=−1 relates to legitimate network traffic records. The network traffic monitored in a given period of time is fully described by the completely annotated data $D_{cmp} = \{(x_1, y_1), \ldots, (x_m, y_m)\} \in (X \times Y)^m$ assumed to be generated from random variables with an unknown distribution p(x; y). Since, as discussed above, obtaining the complete annotation is expensive, a weaker annotation is obtained by assigning labels to bags of network traffic records or flows instead of assigning labels to individual flows. The weakly annotated data $D_{bag} = \{x_1 \ldots, x_m, (B_1, z_1), \ldots, (B_n, z_n)\}$ are composed of the flow or network traffic features $\{x_1, \ldots, x_m\} \in X^m$ along with their assignment to labeled bags $\{(B_1, z_1), \ldots, (B_n, z_n)\} \in (P \times Y)^n$ where P is a set of all partitions 1 of indices $\{1, \ldots, m\}$. The i-th bag is a set of flow features $\{x_j | j \in B_i\}$ labeled by $z_i \in Y$. The weakly annotated data $D_{bag}$ carry a partial information about the completely annotated data $D_{cmp}$.

In particular, to formulate the learning criterion of the NP process at 415, it is assumed (1) that the flow features $\{x_1, \ldots, x_m\}$ in $D_{cmp}$ and $D_{bag}$ are the same, (2) that the negative bags contain just a single network traffic record which is correctly labeled (that is $z_i = -1$ implies $|B_i| = 1$ and $y_i = -1$), and (3) that the positive bags have a variable size and at least one network traffic record (or instance) is positive (that is $z_i = +1$ implies $\exists j \in B_i$ such that $y_j = +1$).

Based on the above, a NP detector $h^* \in H \subseteq Y^x$ (which corresponds to MIL classifier 260 in FIG. 2) is constructed which attains the minimal false negative rate $FN(h) = \mathbb{E}_{p(x|y=+1)}[h(x) = -1]$ among all detectors with the false positive rate $FP(h) = \mathbb{E}_{p(x|y=-1)}[h(x) = +1]$ not higher than a prescribed threshold $\beta > 0$. The learning criterion of the NP process is formulated to find $h^*$ such that $FP(h^*) \leq \beta$ and $FN(h^*) = \inf_{h \in H} FN(h)$ s. t. $FP(h) \leq \beta$ which describes the NP problem to be solved. This problem cannot be solved directly since the distribution p(x,y) is unknown. Therefore, the weakly annotated data $D_{bag}$ is used to solve the problem approximately via an empirical risk minimization approach.

Method 400 continues to 420, at which the NP detector process is approximated and based on the approximation, learning of the NP detector is formulated as the following optimization problem:

$$(w^*, w_0^*) = \operatorname*{argmin}_{w \in \mathbb{R}^d, w_0 \in \mathbb{R}} [a \cdot \overline{FP}(w, w_0) + (1 - a) \cdot \overline{FN}(w, w_o)],$$

where $a \in \mathbb{R}_{++}$ is a cost factor used to tune the trade-off between the number of false negatives and false positives. The optimization problem formulated at 420 is not convex due to the term $\overline{FP}(w, w_0)$.

The optimization problem formulated at 420 is solved by an average stochastic gradient descent (SGD) algorithm. At 425, the SGD algorithm is initialized with random parameters including a number of epochs or iterations. At 430 it is determined whether a maximum number of epochs or iterations is reached. If it is determined that the maximum number of epochs or iterations is not reached, method 400 moves to 435 at which the SGD algorithm randomly chooses a trainings sample. At 440 parameters for solving the optimization problem are optimized and method 400 returns to 430. When the maximum number of epochs or iterations is reached, method 400 continues to 445 at which optimal parameters for resolving the optimization problem for the NP detector are found.

Figure 5:
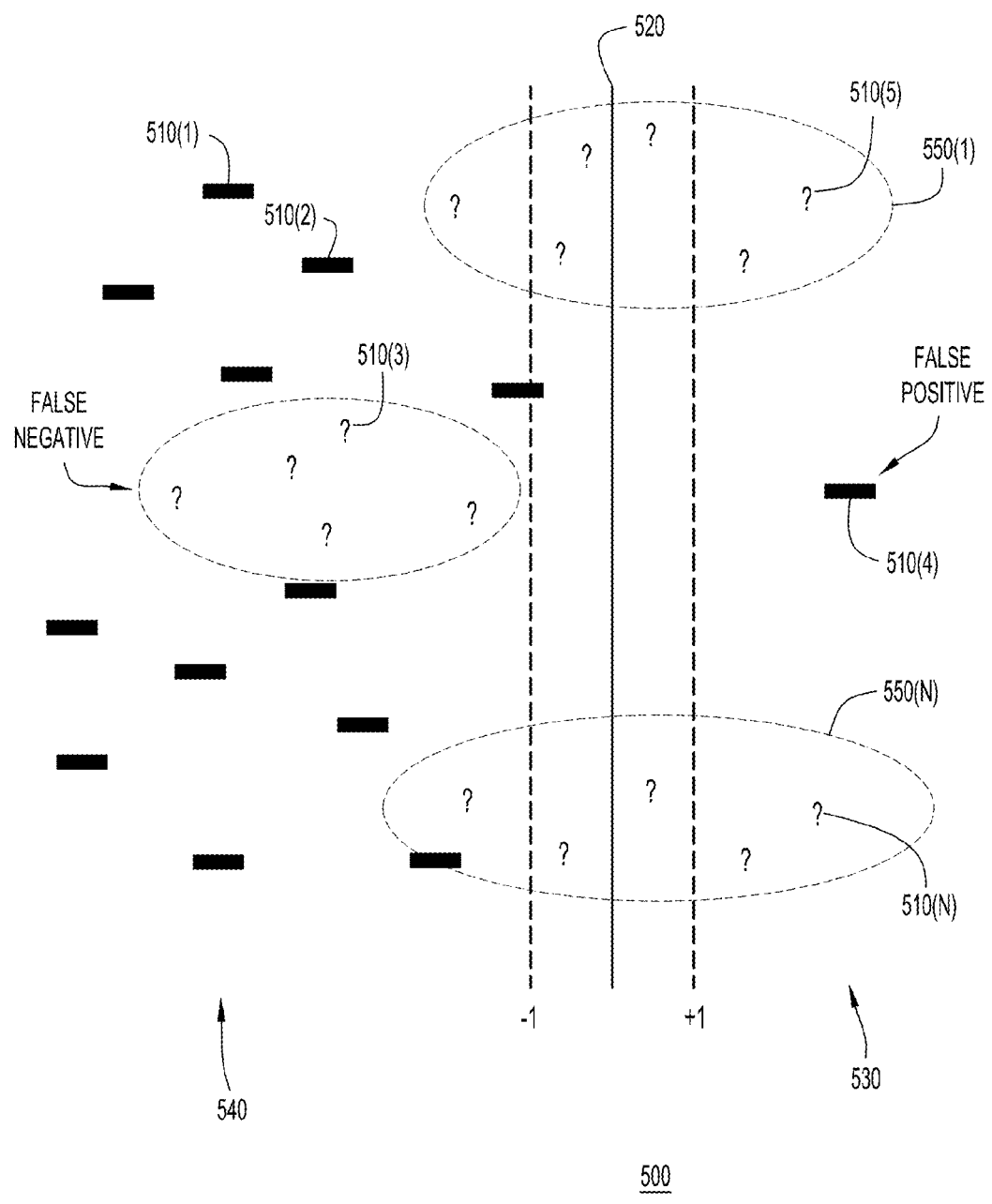
FIG. 5 is a diagram illustrating false negative rates of network traffic records that are replaced by false negative rates of the groups of network traffic records according to an example embodiment.

Reference is now made to FIG. 5 which shows a distribution 500 of network traffic records 510(1) to 510(N) of a training set projected onto the 2D space. Line 520 shows the decision hyperplane that divides the 2D space into area 530 into which positive or malicious network traffic records are projected and area 540 into which negative or legitimate network traffic records are projected. Some of the network traffic records, such as network traffic records 510(1) and 510(2) are correctly projected. However, other network traffic records are incorrectly classified (i.e., classified with flaws) and projected such as network traffic record 510(3) and 510(4).

As discussed above, by resolving the optimization problem for the NP detector, a weighted sum of false negative (FN) rates and false positive (FP) rates is minimized. Due to the unknown labels for positive network traffic records or instances (such as network traffic records 510(5) and 510(N)), the false negative rate of instances of network traffic records is replaced by the false negative rate of bags 550(1) to 550(N).

Figure 6:
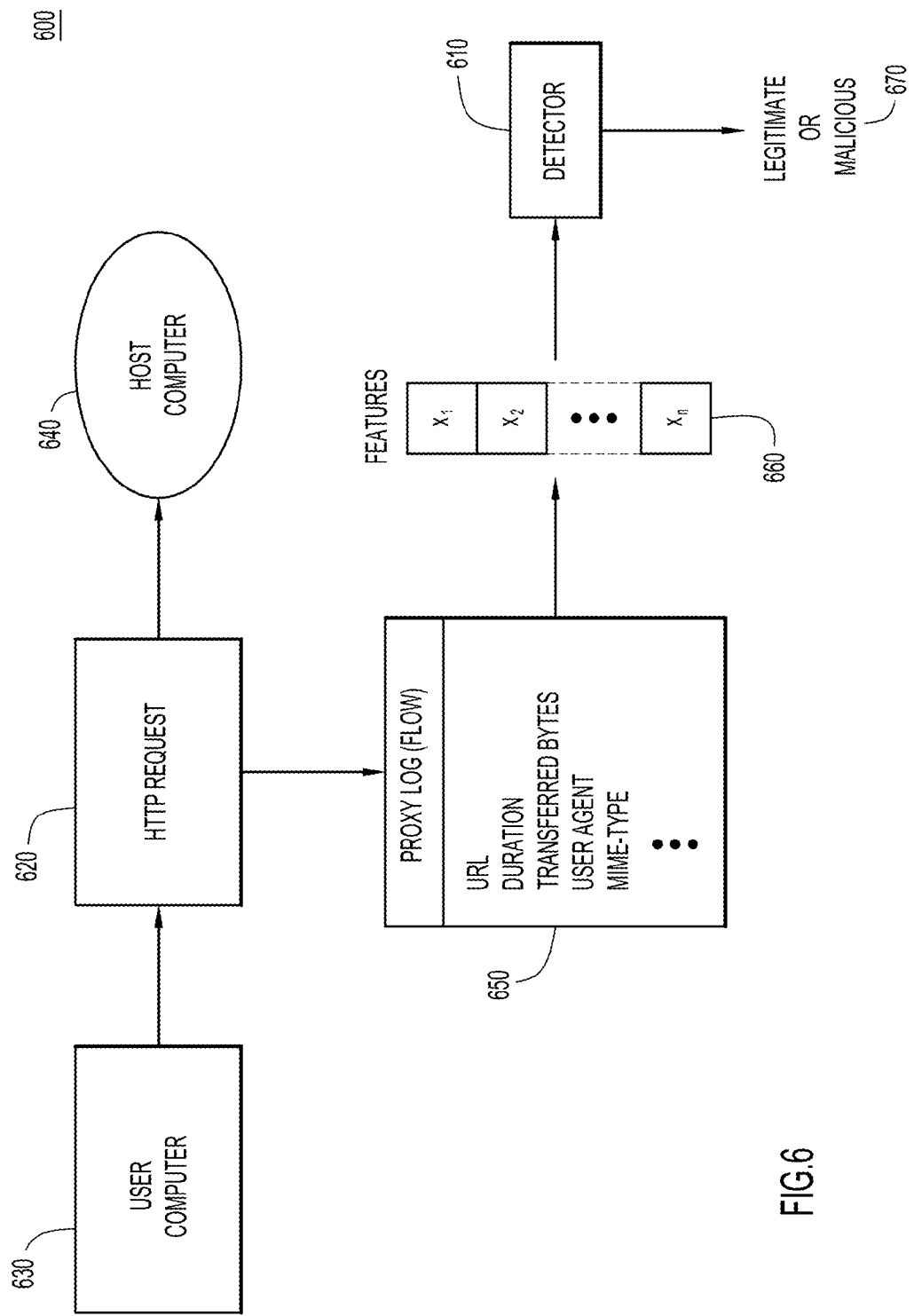
FIG. 6 is a diagram illustrating a trained detector that is utilized to identify network communications between a user computer and a host computer as malware or legitimate network communication according to an example embodiment.

Reference is now made to FIG. 6 (with continued reference to FIGS. 1 to 4), which shows networking environment 600 that includes trained detector 610 to identify HTTP request 620 transmitted between user computer 630 and host computer 640 as either malware network communications or legitimate network communications. Trained detector 610 corresponds to detector logic 126 in FIG. 1 and MIL classifier 260 in FIG. 2. User computer 630 corresponds to computing devices 150 and 160 in FIG. 1, host computer 640 corresponds to safe network server 170, unsafe network server 180 in FIG. 1 and host computers 320(1) to 320(N) in FIG. 3. When user computer 630 sends HTTP request 620 to host computer 640, a network security device (not shown), such as network security 140, generates proxy log 650 (which corresponds to network traffic records 335(1) to 335(N) in FIG. 3.

Proxy log or flow 650 may consist of the following flow fields: URL, flow duration, number of bytes transferred from a client device (e.g., computing devices 150 and 160) to a server (e.g., safe network server 170 and unsafe network server 180) and from the server to the client device, user agent, Multipurpose Internet Mail Extensions (MIME) type, etc. Features 660 that correspond to the network traffic features described above in conjunction with operation 415 in FIG. 4 are extracted from proxy log 650 to be analyzed by detector 610 which operates utilizing optimal parameters determined in step 445 in FIG. 5 to generate result 670 that identifies HTTP request 620 as a malware or a legitimate networking request.

Referring now to FIG. 7 (with continued reference to FIGS. 1, 2 and 6), a flow chart is described of method 700 for training a detector process (e.g., detector logic 126 or detector 610) to identify network communication between a computing device (e.g., user computer 630 and host computer 640 in FIG. 6). Method 700 is performed by training logic 124 and detector logic 126. Method 700 begins at 705 where network traffic records 128 are classified as either malware network traffic records or legitimate network traffic records (such as network traffic records 210 in FIG. 2 to which plus signs 215 and minus signs 220 are assigned).

At 710, the classified network traffic records are divided into at least one group of classified network traffic records (such as bags 245(1) to 245(N) in FIG. 2). The at least one group of network traffic records includes classified network traffic records associated with network communications between a computing device and a server for a predetermined period of time.

At 715, the at least one group of classified network traffic records (such as bag 245(1) in FIG. 2) is labeled as malicious when at least one of the classified network traffic records in the at least one group is malicious. The at least one group of classified network traffic records (such as bag 245(4) in FIG. 2) is labeled as legitimate when none of the classified network traffic records in the at least one group is malicious.

At 720, a detector process is trained on individual classified network traffic records in the at least one labeled group of classified network traffic records, and at 725, network communication between the computing device and the server is identified as malware network communication utilizing the trained detector process.

Figure 8:
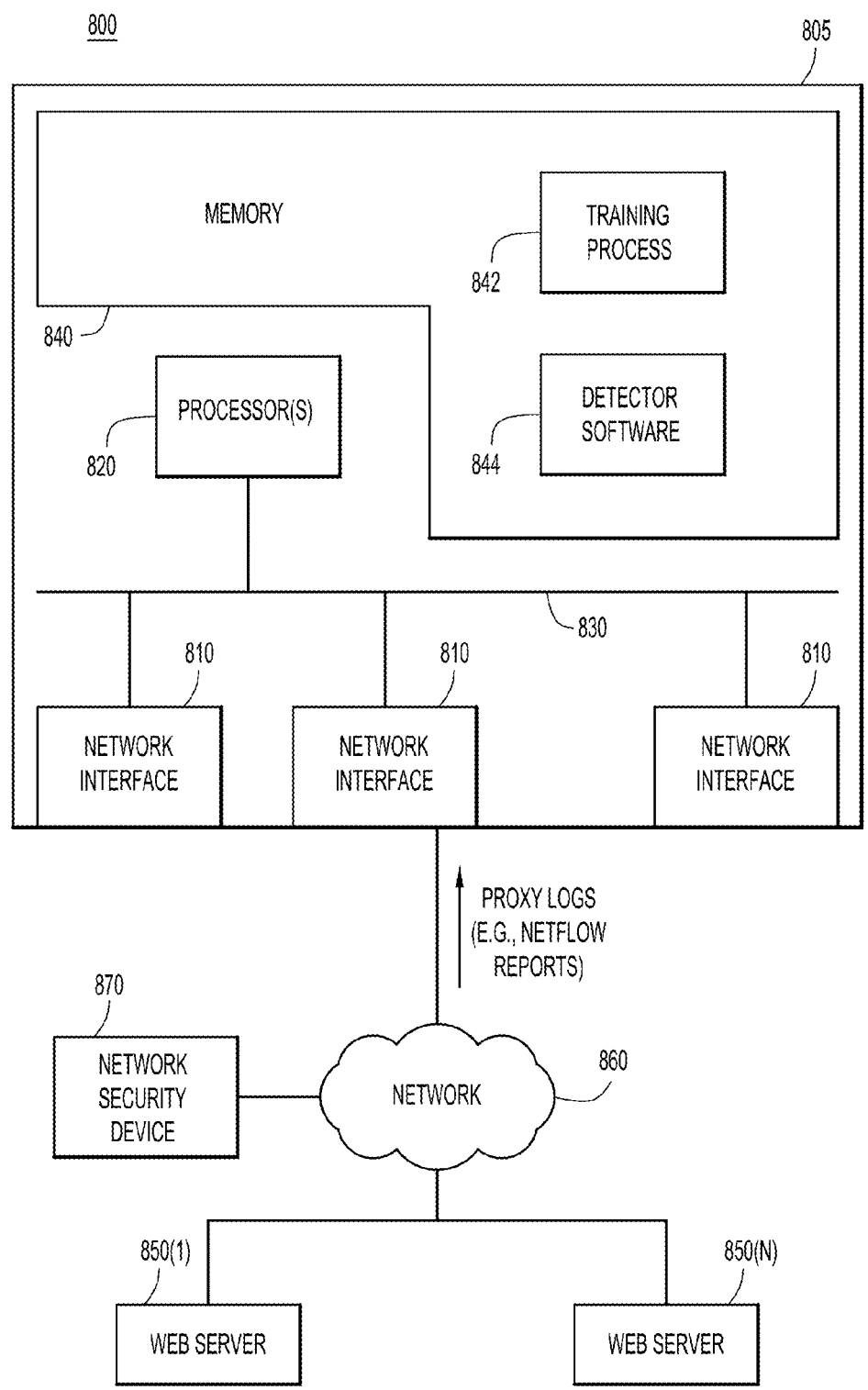
FIG. 8 is a diagram of a network environment illustrating a deployment of a learning detector for malicious network traffic according to another example embodiment.

Reference is now made to FIG. 8. FIG. 8 is a system diagram illustrating how the process depicted in FIG. 2 may be deployed in a network/computing environment 800 according to another example embodiment. A device 805, which may be a server computer, firewall, network intrusion device, etc., includes a plurality of network interfaces 810 (e.g., network ports of a network interface card), a processor 820 (or multiple processors), a bus 830 and memory 840. Memory stores instructions for, among other functions, control software training process 842 and detector/classifier software 844. When the processor 820 executes the software instructions for training process 842, the processor is operable to perform the operations described herein, the output of which can be used by the detector software 844. However, the detector software 844 need not reside in the same physical device in which the training is performed.

The device 805 may be configured to intercept network traffic from one or more web servers 850(1) to 850(N) connected to network 860 so as to detect attempts to inject malware into any device connected in network 860. Network 860 may be an enterprise network. A network security device (e.g., firewall) 870 or any network device connected to network 860 may generate proxy logs (NetFlow reports) that are sent to the device 805 for use in techniques presented herein.

The memory 840 may include read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the processor 820) it is operable to perform the operations described herein.

Reference is now made to FIGS. 9A to 9D (with continued reference to FIGS. 2, 4 and 6), which show results of experiments that were conducted to empirically evaluate the detectors (such as MIL classifier 260 in FIG. 2 and detector 610 in FIG. 6) of malicious communication learned from weakly labeled data. Two detectors were compared that learned from the same data by different methods.

A first detector (a standard binary SVM detector) was trained as a baseline by solving the following convex program:

$$(w^*, w_0^*) = \operatorname*{argmin}_{w \in \mathbb{R}^d, w_0 \in \mathbb{R}} \left[ \frac{1}{2} \|w\|^2 + C \cdot (1-a) \sum_{i \in \mathcal{J}_+} \max\{0, 1 - \langle w, x_i \rangle - w_0\} + C \cdot a \sum_{i \in \mathcal{J}_-} \max\{0, 1 + \langle w, x_i \rangle + w_0\} \right]$$

where $a \in \mathbb{R}_{++}$ is a cost factor used to tune the trade-of between the number of the false negatives and the false positives. The constant $C \in \mathbb{R}_{++}$ steers the amount of regularization. This method considers all network traffic records in the positive bags to be positive and similarly all network traffic records in the negative bags to be negative.

A second detector (e.g., MIL detector 260 in FIG. 2) was trained by solving the NP optimization problem discussed above with regard to operation 415 in FIG. 4.

In one example simulation, each detector operates on all test flows and selects the top 150 network traffic records or instances with the highest decision score. The source data contain only weak labels. The model selection and the final evaluation of the detectors require the ground truth labels for a subset of flows from the validation and the testing subset. The ground truth labels are obtained via submitting the flows' URL to a "VirusTotal" service. The VirusTotal service is a webserver based service for checking files for viruses. For each submitted URL, the VirusTotal service provides a report containing an analysis of a set of URL scanners.

The number of scanners at the time of evaluation was 62. The report is summarized by the number of positive hits, that is, the number of scanners which marked the URL as malicious. If at least three scanners marked the URL as malicious the flow was labeled as true positive.

Plots 910 and 920 in FIGS. 9A and 9B present results obtained on the first 150 test flows with the highest decision score computed by the MIL and the SVM detector and illustrate the number of true positives and the precision as a function of increasing decision threshold. Plot 910 in FIG. 9A shows the number of true positives and chart 920 in FIG. 9B shows the precision of the detectors as a function of the number of detected flows. In addition, results are shown for a baseline detector selecting the flows randomly. As shown in FIGS. 9A and 9B, in the top 150 instances selected by the MIL detector out of 9,696,453 testing flows, 22 are true positives while the baseline SVM detector found just 6 true positives.

Figure 9D:
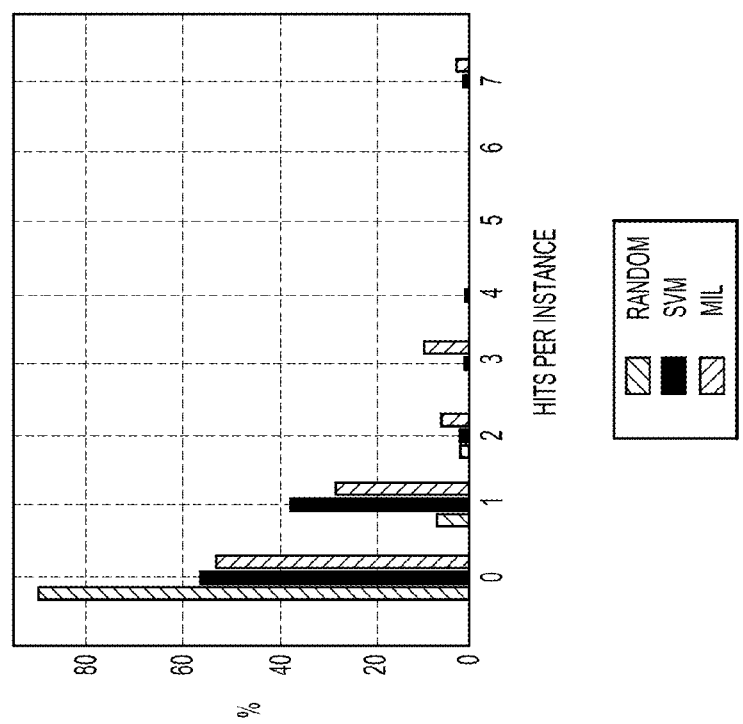
Figure 9C:
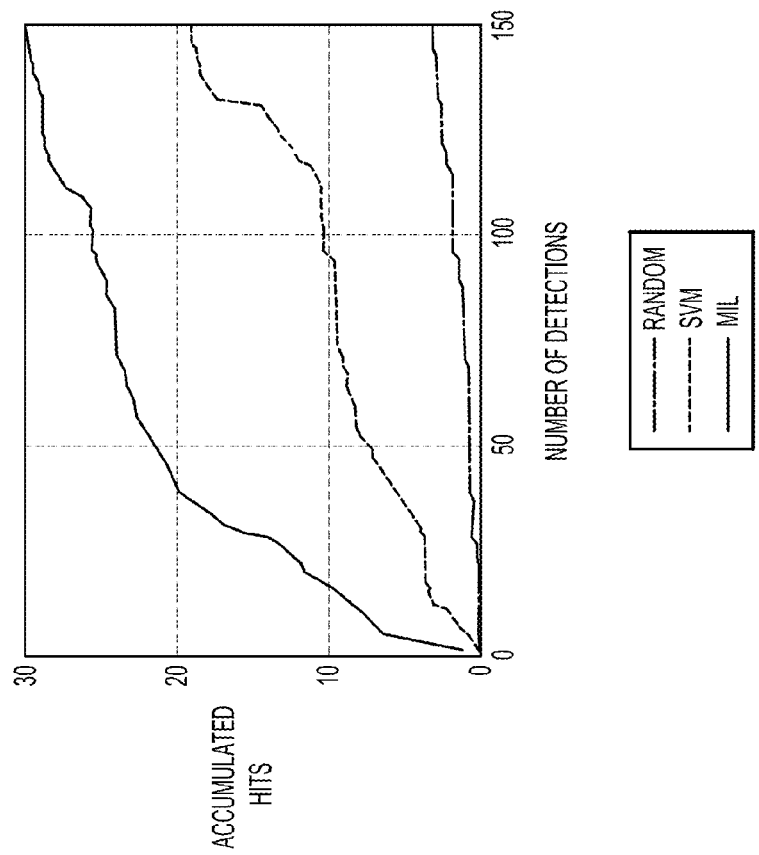

The detectors were also evaluated in terms of the number of VirusTotal hits being the finer annotation used to define the ground true labels. The flow with the number of hits greater than 2 is marked as the true positive. The results are presented in FIGS. 9C and 9D. Plot 930 in FIG. 9C shows the number of accumulated hits with respect to the number of flows selected by the MIL and the SVM detector. Chart 940 in FIG. 9D shows a histogram of the number of hits per network traffic record or instance computed for the first 50 flows with the highest decision score. The flows with the number of hits higher than 2 are the true positives. Plot 930 and chart 940 in FIGS. 9C and 9D show the number of accumulated hits as a function of the detected flows. The proposed MIL detector detected more flows with three or more hits, unlike the random selection or baseline SVM detector.

In summary, in a conventional classification system different sets of proxy logs are generated to train a classifier, one set of proxy logs representing malicious network traffic and another set of proxy logs representing legitimate network traffic. However, obtaining a sufficiently large and diverse set of malicious traffic records is very time consuming and very expensive because it typically requires employing a security analysis to verify whether the network traffic is legitimate or malicious. Techniques presented herein train a flow-based classifier based on weak annotations, i.e., labeled bags of network traffic records, which are easier to obtain. While the classifier is trained based on the weak annotations, the trained classifier is still classifying each individual flow of network traffic. In other words, the techniques described herein allow classifying individual flows of network traffic but are trained based on training sets organized in bags that include network traffic records for network traffic directed to a particular domain for a particular user.

There are several unique aspects of the system that are summarized as follows: First, a machine learning system is provided for malicious network traffic that uses weak supervision in training. The training uses labels of groups of flows (bags) to obtain a flow-level classifier. This system uses weak supervision during training. This means that the labeling process can label entire groups of flows (bags). For example, the groups of flows can be labeled based on known malicious domains or compromised users. Importantly, the final classifier makes the decision about each individual flow. This is achieved by the Multiple Instance Learning process.

Second, the weak labeling uses black lists, domain reputation, security reports, and sandboxing analysis to define positive (malicious) and negative (legitimate) bags based on the proxy log domain. The weak labeling as provided by the bags is used to train a flow-level classifier. The important point here is that the labels accepted by the training algorithm can be weak. The algorithm gathers intelligence about domains from all available sources to create weak labels. The algorithm then trains a classifier that marks individual flows as malicious or legitimate. The training optimally selects the decision boundary and handles possible label mistakes induced by the group labeling.

Third, the malicious traffic is found by a NP detector combined with a modified MIL framework. The NP detector minimizes false negatives while also minimizing false positives (lower than a prescribed value) and thus providing accuracy guarantees. The MIL handles the weak labeling.

Fourth, due to the weak supervision, the system can be easily (and frequently) retrained based on the updated security intelligence feeds. The vast amounts of intelligence (as available from the feeds, for example) do not allow manual confirmation of these sources before using them to prepare training data. Furthermore, the labeling is often weak, i.e. it is available at the domain level (for example) while the classifier operates on individual flows. Nonetheless, the algorithm can deal with these constrains and successfully train a robust flow-level classifier.

MIL handles possible label mistakes induced by the group labeling which simplifies the verification and deployment. The MIL algorithm minimizes a weighted sum of errors made by the detector on the negative bags and the positive bags which makes it possible to tolerate some non-malicious samples being present in the positive bags. The system can be used to detect malicious proxy logs as trained using domains in the URL of the proxy log.

The use of the NP detector in a modified MIL algorithm within the network security context is not heretofore known. Compared to the modified MIL, the previously published Multiple Instance Support Vector Machines (mi-SVM) optimizes the classification error (alpha weighing in the objective function is set to 0.5), wherein the objective function contains an additional regularization term, and the negative bags can contain more than a single instance. Again, the MIL algorithm using an NP detector has not been previously used to detect malicious traffic.

The conceptual problem in using the standard supervised machine learning methods to detect malicious network traffic is the lack of sufficiently representative training set containing examples of malicious and legitimate communication. The system presented herein can recognize malicious traffic by learning from the weak annotations. Weak supervision in training is achieved on the level of properly defined bags of proxy logs (using request domains) by leveraging Internet domain black lists, security reports, and sandboxing analysis.

The system uses generic features extracted from URLs and additional attributes if they are available (e.g. proxy log fields). The features are then used in a weakly-supervised machine learning algorithm to train a system that discriminates between malicious and legitimate traffic. The system is by-design general. Such system can be used where weak labels are available, for example to detect malicious HTTP requests as trained from malicious domains. This applies to spam, phishing, command-and-control communication, and other types of malicious traffic.

This system extracts a number of generic features from proxy logs of HTTP requests and trains a detector of malicious communication using publicly-available blacklists of malware domains. Since the blacklists contain labeling only at the level of domains while the detector operates on richer proxy logs with a full target web site URL, the labeled domains only provide weak supervision for training.

A key advantage for deploying new products using this technology is that the requirements on the labeled samples (and their accuracy) are lower. In this way, the system can train a detector that operates on individual proxy-logs while the training uses only domains to indicate malicious or legitimate traffic.

Since the labeling is at the level of domains while the system trains a proxy log classifier, it can happen that some proxy logs in the positive bags (labeled positive based on the domain) can be negative (legitimate). The training algorithm correctly handles such cases.

The training can take advantage of large databases of weak annotations (such as security feeds). Since the databases are updated frequently, the detectors are also retrained to maintain highest accuracy. The training procedure relies on generic features and therefore generalizes the malware behavior from the training samples. As such the detectors find malicious traffic not present in the intelligence database (marked by the feeds).

In one form, a computer-implemented method is provided comprising: at a networking device, classifying network traffic records as either malware network traffic records or legitimate network traffic records, dividing classified network traffic records into at least one group of classified network traffic records, the at least one group including classified network traffic records associated with network communications between a computing device and a server for a predetermined period of time, labeling the at least one group of classified network traffic records as malicious when at least one of the classified network traffic records in the at least one group is malicious or labeling the at least one group of classified network traffic records as legitimate when none of the classified network traffic records in the at least one group is malicious to obtain at least one labeled group of classified network traffic records, training a detector process on individual classified network traffic records in the at least one labeled group of classified network traffic records to learn a flow-level model based on the labeling of the at least one group of classified network traffic records, and identifying malware network communications between the computing device and the server utilizing the flow-level model of the detector process.

In another form, an apparatus comprising: one or more processors, one or more memory devices in communication with the one or more processors, and at least one network interface unit coupled to the one or more processors, wherein the one or more processors are configured to: classify network traffic records as either malware network traffic records or legitimate network traffic records, divide classified network traffic records into at least one group of classified network traffic records, the at least one group including classified network traffic records associated with network communications between a computing device and a server for a predetermined period of time, label the at least one group of classified network traffic records as malicious when at least one of the classified network traffic records in the at least one group is malicious or label the at least one group of classified network traffic records as legitimate when none of the classified network traffic records in the at least one group is malicious to obtain at least one labeled group of classified network traffic records, train a detector process on individual classified network traffic records in the at least one labeled group of classified network traffic records to learn a flow-level model based on the labeling of the at least one group of classified network traffic records; and identify malware network communications between the computing device and the server utilizing the flow-level model of the detector process.

In still another form, one or more computer readable non-transitory storage media encoded with software comprising computer executable instructions that when executed by one or more processors cause the one or more processor to: classify network traffic records as either malware network traffic records or legitimate network traffic records, divide classified network traffic records into at least one group of classified network traffic records, the at least one group including classified network traffic records associated with network communications between a computing device and a server for a predetermined period of time, label the at least one group of classified network traffic records as malicious when at least one of the classified network traffic records in the at least one group is malicious or label the at least one group of classified network traffic records as legitimate when none of the classified network traffic records in the at least one group is malicious to obtain at least one labeled group of classified network traffic records, train a detector process on individual classified network traffic records in the at least one labeled group of classified network traffic records to learn a flow-level model based on the labeling of the at least one group of classified network traffic records, and identify malware network communications between the computing device and the server utilizing the flow-level model of the detector process.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
at a networking device, classifying network traffic records as either malware network traffic records or legitimate network traffic records, wherein a subset of the classified network traffic records is classified with flaws;
dividing classified network traffic records into at least one group of classified network traffic records, the at least one group including classified network traffic records associated with network communications between a computing device and a server for a predetermined period of time;
labeling the at least one group of classified network traffic records as malicious when at least one of the classified network traffic records in the at least one group is malicious or labeling the at least one group of classified network traffic records as legitimate when none of the classified network traffic records in the at least one group is malicious to obtain at least one labeled group of classified network traffic records;
training a detector process on individual classified network traffic records in the at least one labeled group of classified network traffic records to learn a flow-level model based on the labeling of the at least one group of classified network traffic records, wherein the detector process is a Neyman-Pearson (NP) detector process combined with a Multi Instance Learning (MIL) algorithm; and
identifying malware network communications between the computing device and the server utilizing the flow-level model of the detector process, wherein the NP detector process reduces a false negative rate of detection results to achieve a predetermined false positive rate of the detection results when identifying the malware network communication, and wherein the MIL algorithm reduces an impact of flawed classified network traffic records on an accuracy of the detector process in identifying malware network communication.

2. The method of claim 1, wherein the network traffic records include proxy logs, and
wherein the classifying comprises analyzing proxy log domains of the proxy logs to classify the network traffic records.

3. The method of claim 1, wherein the classifying comprises classifying network traffic records based on blacklists, domain reputation, security reports and sandboxing analysis results.

4. The method of claim 3, further comprising:
repeatedly retraining the detector process based on updated blacklists, domain reputation, security reports and sandboxing analysis results.

5. The method of claim 1, wherein a false positive rate of the detector process is determined by an instance that has a maximal distance from a malicious decision hyperplane.

6. The method of claim 1, wherein the MIL algorithm reduces a weighted sum of errors made by the detector process on the at least one labeled group of classified network traffic records and allows the subset of the classified network traffic records that is classified with flaws.

7. The method of claim 1, wherein training the detector process comprises:
estimating a number of false positive detection results and a number of false negative detection results for results generated by the NP detector process;
formulating a learning criterion for training the NP detector process and solving an optimization problem by using a parameter to weight the estimated numbers of the false positive detection results and the false negative detection results;
randomly generating parameters for a stochastic gradient descent (SGD) function;
repeatedly executing the SGD function using the randomly generated parameters thereby optimizing operating parameters of the NP detector process.

8. An apparatus comprising:
one or more processors;
one or more memory devices in communication with the one or more processors; and
at least one network interface unit coupled to the one or more processors,
wherein the one or more processors are configured to:
classify network traffic records as either malware network traffic records or legitimate network traffic records, wherein a subset of the classified network traffic records is classified with flaws;
divide classified network traffic records into at least one group of classified network traffic records, the at least one group including classified network traffic records associated with network communications between a computing device and a server for a predetermined period of time;
label the at least one group of classified network traffic records as malicious when at least one of the classified network traffic records in the at least one group is malicious or label the at least one group of classified network traffic records as legitimate when none of the classified network traffic records in the at least one group is malicious to obtain at least one labeled group of classified network traffic records;
train a detector process on individual classified network traffic records in the at least one labeled group of classified network traffic records to learn a flow-level model based on the labeling of the at least one group of classified network traffic records, wherein the detector process is a Neyman-Pearson (NP) detector process combined with a Multi Instance Learning (MIL) algorithm; and
identify malware network communications between the computing device and the server utilizing the flow-level model of the detector process, wherein the NP detector process reduces a false negative rate of detection results to achieve a predetermined false positive rate of the detection results when identifying the malware network communication, and wherein the MIL algorithm reduces an impact of flawed classified network traffic records on an accuracy of the detector process in identifying malware network communication.

9. The apparatus of claim 8, wherein the network traffic records include proxy logs, and
wherein the one or more processors are configured to classify network traffic records by analyzing proxy log domains of the proxy logs to classify the network traffic records.

10. The apparatus of claim 8, wherein the one or more processors are configured to classify network traffic records based on blacklists, domain reputation, security reports and sandboxing analysis results.

11. The apparatus of claim 10, wherein the one or more processors are configured to:
repeatedly retrain the detector process based on updated blacklists, domain reputation, security reports and sandboxing analysis results.

12. The apparatus of claim 8, wherein a false positive rate of the detector process is determined by an instance that has a maximal distance from a malicious decision hyperplane.

13. The apparatus of claim 8, wherein the MIL algorithm reduces a weighted sum of errors made by the detector process on the at least one labeled group of classified network traffic records and allows the subset of the classified network traffic records that is classified with flaws.

14. The apparatus of claim 8, wherein the one or more processor is configured to train the detector process by:
estimating a number of false positive detection results and a number of false negative detection results for results generated by the NP detector process;
formulating a learning criterion for training the NP detector process and solving an optimization problem by using a parameter to weight the estimated numbers of the false positive detection results and the false negative detection results;
randomly generating parameters for a stochastic gradient descent (SGD) function;
repeatedly executing the SGD function using the randomly generated parameters thereby optimizing operating parameters of the NP detector process.

15. One or more computer readable non-transitory storage media encoded with software comprising computer executable instructions that when executed by one or more processors cause the one or more processor to:
classify network traffic records as either malware network traffic records or legitimate network traffic records, wherein a subset of the classified network traffic records is classified with flaws;
divide classified network traffic records into at least one group of classified network traffic records, the at least one group including classified network traffic records associated with network communications between a computing device and a server for a predetermined period of time;
label the at least one group of classified network traffic records as malicious when at least one of the classified network traffic records in the at least one group is malicious or label the at least one group of classified network traffic records as legitimate when none of the classified network traffic records in the at least one group is malicious to obtain at least one labeled group of classified network traffic records;
train a detector process on individual classified network traffic records in the at least one labeled group of classified network traffic records to learn a flow-level model based on the labeling of the at least one group of classified network traffic records, wherein the detector process is a Neyman-Pearson (NP) detector process combined with a Multi Instance Learning (MIL) algorithm; and
identify malware network communications between the computing device and the server utilizing the flow-level model of the detector process, wherein the NP detector process reduces a false negative rate of detection results to achieve a predetermined false positive rate of the detection results when identifying the malware network communication, and wherein the MIL algorithm reduces an impact of flawed classified network traffic records on an accuracy of the detector process in identifying malware network communication.

16. The computer readable non-transitory storage media of claim 15, wherein the network traffic records include proxy logs,
wherein the instructions that cause the one or more processors to classify comprise instructions operable to analyze proxy log domains of the proxy logs to classify the network traffic records.

17. The computer readable non-transitory storage media of claim 15, wherein the executable instructions cause the one or more processors to classify the network traffic records by:
classifying the network traffic records based on blacklists, domain reputation, security reports and sandboxing analysis results.

18. The computer readable non-transitory storage media of claim 17, wherein the executable instructions further cause the one or more processors to:
repeatedly retrain the detector process based on updated blacklists, domain reputation, security reports and sandboxing analysis results.

19. The computer readable non-transitory storage media of claim 15, wherein a false positive rate of the detector process is determined by an instance that has a maximal distance from a malicious decision hyperplane.

20. The computer readable non-transitory storage media of claim 15, wherein the MIL algorithm reduces a weighted sum of errors made by the detector process on the at least one labeled group of classified network traffic records and allows the subset of the classified network traffic records that is classified with flaws, and
wherein the instructions further cause the one or more processors to train the detector process by:
estimating a number of false positive detection results and a number of false negative detection results for results generated by the NP detector process;
formulating a learning criterion for training the NP detector process and solving an optimization problem by using a parameter to weight the estimated numbers of the false positive detection results and the false negative detection results;
randomly generating parameters for a stochastic gradient descent (SGD) function;
repeatedly executing the SGD function using the randomly generated parameters thereby optimizing operating parameters of the NP detector process.

\* \* \* \* \*